(12) United States Patent
Jorgensen

(10) Patent No.: US 7,484,368 B2
(45) Date of Patent: Feb. 3, 2009

(54) CLUTCHED SUPER TURBO CONTROL STRATEGY

(75) Inventor: Rory E. Jorgensen, Manhattan Beach, CA (US)

(73) Assignee: Eaton Corporation, Cleveland, OH (US)

( * ) Notice: Subject to any disclaimer, the term of this patent is extended or adjusted under 35 U.S.C. 154(b) by 82 days.

(21) Appl. No.: 11/502,666

(22) Filed: Aug. 11, 2006

(65) Prior Publication Data

US 2008/0034751 A1 Feb. 14, 2008

(51) Int. Cl.
*F02B 33/44* (2006.01)
(52) U.S. Cl. .......................................... 60/607; 60/608
(58) Field of Classification Search ........... 60/607–608, 60/611; 123/559.3, 564
See application file for complete search history.

(56) References Cited

U.S. PATENT DOCUMENTS

| | | | |
|---|---|---|---|
| 4,485,793 A | 12/1984 | Oguma | |
| 4,656,992 A * | 4/1987 | Oonaka et al. | 123/559.3 |
| 5,115,788 A | 5/1992 | Sasaki et al. | |
| 2006/0032225 A1 * | 2/2006 | Dyne et al. | 60/607 |

FOREIGN PATENT DOCUMENTS

| | | |
|---|---|---|
| EP | 1 355 052 A | 10/2003 |
| GB | 2 154 280 A | 9/1985 |
| JP | 63 129121 A | 6/1988 |
| JP | 11 324692 A | 11/1999 |
| WO | WO 92/04536 A | 3/1992 |

OTHER PUBLICATIONS

PCT Search Report, PCT IB/2007/002329 search completed Jan. 7, 2008.

* cited by examiner

*Primary Examiner*—Hoang M Nguyen
(74) *Attorney, Agent, or Firm*—Anna M. Shih

(57) ABSTRACT

A method of controlling an internal combustion engine boosting system of the type including an exhaust-driven turbocharger and a mechanically-driven supercharger. The supercharger includes rotors and a clutch operable in a first condition to transmit torque from a mechanical drive source to a supercharger input in response to a positive input, and operable in a second condition to interrupt the transmission of torque from the source to the input. The method is characterized by determining possible operation of the clutch in a first condition; and commanding a bypass valve toward a closed position, forcing air through the supercharger. The airflow causes the supercharger rotors to rotate, thus rotating the input of the supercharger prior to the clutch operating in the first condition.

9 Claims, 4 Drawing Sheets

CLUTCHED SUPER TURBO CONTROL STRATEGY

BACKGROUND OF THE DISCLOSURE

The present invention relates to vehicle engine charging systems, and more particularly, to such systems of the type including both a mechanically-driven supercharger (such as a Roots type blower), and an exhaust gas-driven turbocharger. Vehicle engine charging systems of this type are sometimes referred to, for simplicity, by the term "superturbo".

As is well known to those skilled in the art of vehicle engine boosting, there are two primary types of boosting devices typically used to boost the air pressure in the combustion chamber of internal combustion engines. The first is typically referred to as a "supercharger" (although that term is sometimes used generically for all boosting devices), and for purposes of the present specification, the term "supercharger" will be understood to mean and include a mechanically-driven charging (air pumping) device, i.e., the supercharger is driven at a speed which is normally proportional to engine speed. The second type of boosting device is an exhaust gas-driven turbocharger, i.e., a device including an exhaust gas-driven turbine which, in turn, drives a pump (compressor). Therefore, a turbocharger is driven at a speed generally proportional to the flow of exhaust gas from the engine exhaust manifold.

The typical mechanically-driven supercharger comprises a positive-displacement pumping device, such as the Roots-type blower, sold commercially by the assignee of the present invention. A Roots-blower supercharger is typically driven, off of the engine crankshaft, by a pulley and belt arrangement. In recent years, it has become more common for those skilled in the supercharger art to interpose a clutch between the engine crankshaft and the input shaft of the Roots blower to reduce noise, vibration and harshness (NVH) and avoid over-speeding the supercharger.

As is also well known to those skilled in the engine supercharger art, it is typical for the Roots-type blower to be provided with a "bypass" passage from the Roots blower outlet, permitting air flow back to the inlet. Within the bypass passage, there is normally disposed some sort of bypass valve, such as a butterfly-type plate valve, operable to move between a closed condition (blocking bypass flow back to the inlet), and an open condition (allowing blower outlet air to flow freely back to the inlet. As is further well known, having the bypass valve in the open condition effectively "unloads" the Roots blower, allowing a certain amount of the air from the outlet to re-circulate back to the inlet, thus reducing the boost pressure of air flowing to the intake manifold, as well as the amount of engine horsepower consumed by the blower, although still requiring more input horsepower than if the clutch were disengaged.

In the typical "superturbo" boosting system, including both the supercharger and the turbocharger, the system would normally be arranged with the supercharger disposed "upstream", and the turbocharger disposed "downstream", i.e., in terms of air flow direction from the intake, past the throttle, and into the combustion chamber. In such a superturbo system, boost is provided primarily by the supercharger at relatively low engine speeds, when there is not yet sufficient flow of exhaust gas to drive the turbocharger. Then, as engine speed increases (medium engine speeds), and as there is sufficient flow of exhaust gas to drive the turbocharger, both the supercharger and the turbocharger, together, provide boost to the engine.

As the assignee of the present invention has been engaged in development of a superturbo system, several observations have been made. First, the general functionality of the known arrangement of superturbo systems is generally acceptable, in terms of achieving boost using the supercharger when that makes sense, and achieving boost using the turbocharger when that makes sense, i.e., matching engine need to capability of each type of boosting device. Second, it has been observed that supercharger engagement can be objectionably harsh due to the sudden and large change in speed of the supercharger (high angular acceleration) as the supercharger clutch is engaged, especially at the lower end of the load range and the higher end of the speed range where the supercharger is operational. Furthermore, when the supercharger clutch is disengaged (e.g., at engine speeds above about 3,500 rpm or below 3,500 rpm when the demanded load is low enough to be covered solely by the turbocharger), and then engine speed drops, and thereafter it is desired to again operate the supercharger, the re-engagement of the supercharger clutch (for example, with the supercharger input stationary, and the clutch turning 2,500 rpm) would typically occur in a sudden manner likely to result, over time, in reduced durability of the clutch, and observed to cause an undesirable NVH condition.

BRIEF SUMMARY OF THE INVENTION

Accordingly, it is an object of the present invention to provide an improved method of controlling an internal combustion engine boosting system of the type including both a mechanically-driven supercharger and an exhaust gas-driven turbocharger (superturbo), which overcomes the above-described disadvantages of the prior art.

It is a more specific object of the present invention to provide such an improved method of controlling an internal combustion engine superturbo boosting system which has the ability to substantially reduce the speed differential between the supercharger clutch and the input to the supercharger, at the time of clutch engagement, thus reducing the undesirable results of sudden clutch engagement.

It is an even more specific object of the present invention to provide such an improved method of controlling an internal combustion engine superturbo boosting system, which achieves the above-stated objects without the need for additional complex and expensive structure, or complex control schemes.

It is another, but related object of the present invention to provide such an improved method of controlling an internal combustion engine superturbo boosting system in which the engagement of the supercharger clutch is not readily apparent to the vehicle driver or occupants.

The above and other objects of the invention are accomplished by the provision of an improved method of controlling an internal combustion engine boosting system of the type comprising an exhaust-driven turbocharger, and a mechanically-driven supercharger in series with the turbocharger and upstream therefrom. The supercharger has rotors and a clutch, operable in a first condition to transmit torque from a source of mechanical drive to an input of the supercharger, in response to a positive input signal, and operable in a second condition to interrupt the transmission of torque from the source to the input of the supercharger. The supercharger has an inlet, an outlet and a bypass passage providing fluid communication between the inlet and the outlet, and a bypass valve disposed within the bypass passage and operable between an open position permitting flow through the bypass passage, and a closed position blocking flow through the bypass passage.

The improved method of controlling the boosting system is characterized by sensing the input signal for the presence of a positive input signal to the clutch indicating possible operation of the clutch in the first condition. The method also includes commanding the bypass valve toward the closed position, forcing air through the supercharger from the inlet through the outlet and thereafter, downstream through the turbocharger. The air flowing through the supercharger causes the supercharger rotors to rotate, thus rotating the input of the supercharger prior to the clutch operating in the first condition.

DETAILED DESCRIPTION OF THE PREFERRED EMBODIMENT

Figure 1:
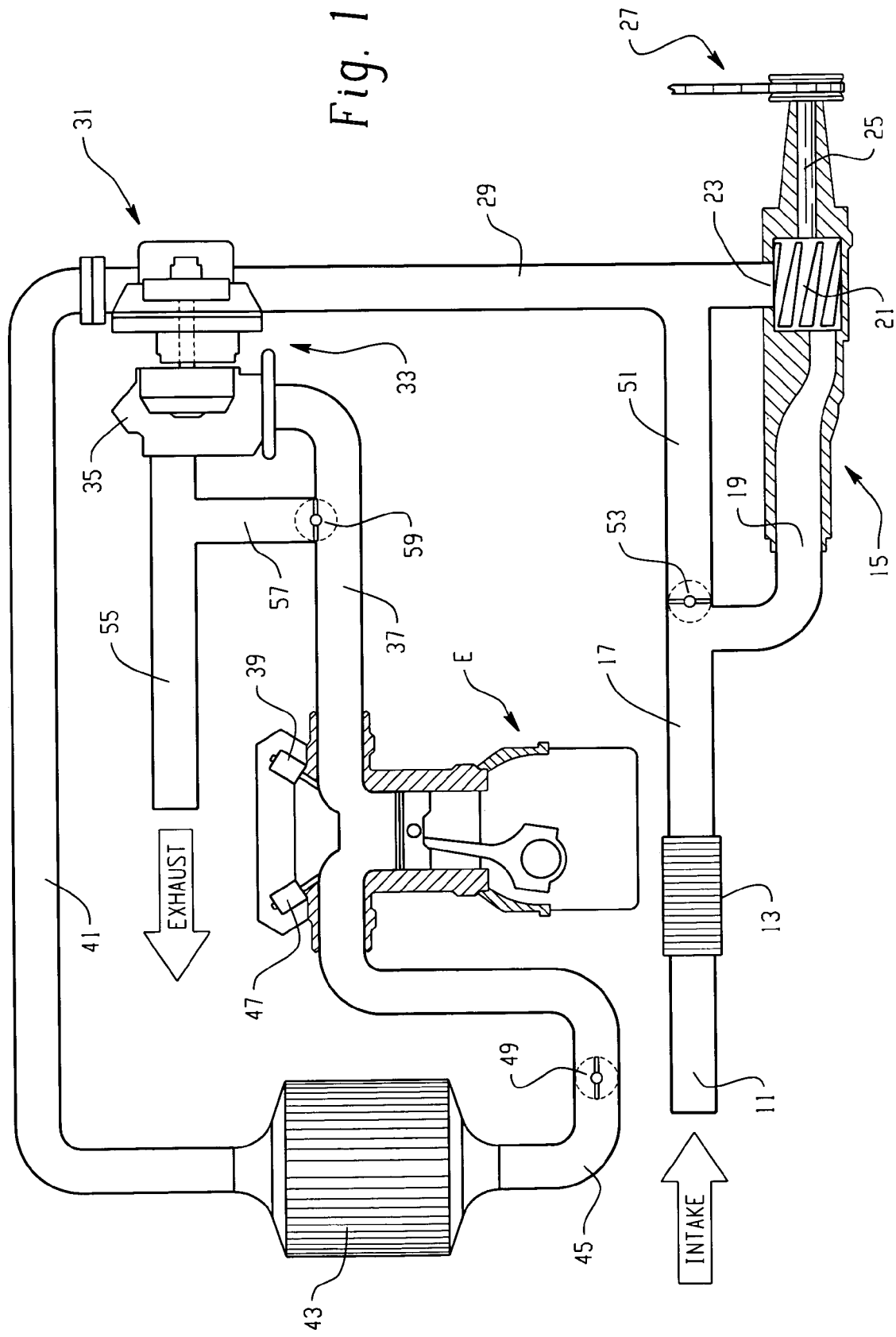
FIG. 1 is a schematic view of a vehicle internal combustion engine, including a superturbo boosting system of the type to which the present invention relates, illustrated in a low-speed operating mode, with the supercharger clutch engaged.

Referring now to the drawings, which are not intended to limit the invention, FIG. 1 illustrates a vehicle internal combustion engine, including a "superturbo" boosting system, as that term has been generally defined, and as will be described in greater detail subsequently. Included is a conventional vehicle engine, generally designated E, and represented herein, for simplicity, by a single cylinder-piston combination. Charge air, to be fed into the combustion chamber of the engine E, enters through an intake 11 (see arrow), then flows through an air filter 13, and then flows to a supercharger, generally designated 15, through an air duct 17 which communicates the incoming air into an inlet 19 of the supercharger.

The supercharger 15 also has, typically, a set of rotors 21 which transport volumes of the incoming air from the inlet 19 of the supercharger 15 to an outlet 23, whenever the supercharger is receiving mechanical drive to its input, represented somewhat schematically as an input shaft 25. The mechanical input to the supercharger is provided only when a clutch, represented schematically by a belt 27 driving a pulley (typically, a "micro v-belt"), is engaged, i.e., the condition shown in FIG. 1. It should be understood by those skilled in the art that the clutch 27 may, within the scope of the present invention, comprise any type of clutch (e.g., engageable friction discs, electromagnetic, etc.) which is effective in transmitting mechanical drive from the vehicle engine (typically, but not necessarily, from the crankshaft) to the input shaft 25 of the supercharger 15. Also, as is also now well known to those skilled in the art, there may be some sort of "step-up gear" speed increasing arrangement between the clutch and the input shaft 25, with a typical ratio for such a speed increasing arrangement being in the range of about 2:1 to about 4:1.

Referring still to FIG. 1, the outlet 23 of the supercharger 15 is in communication, by means of an air duct 29, with a pumping portion (compressor) 31 of a turbocharger, generally designated 33. The turbocharger 33 also includes, as is well known in the art, a turbine portion 35, which is mechanically coupled to, and operable to drive, the compressor 31. The turbine portion 35 is disposed in series in an exhaust gas duct 37, which receives exhaust gas from the engine E in response to operation of an exhaust engine poppet valve 39. The compressor 31 has its outlet in communication with an air duct 41, which then conducts the charge air through an intercooler 43, the function of which is well known, and outside the scope of the invention, and therefore, will not be described further herein. Downstream of the intercooler 43 is an air duct 45, which carries the charge air into the combustion chamber of the engine E, in response to operation of an intake engine poppet valve 47. The present invention is not intended to be limited to the arrangement shown in FIG. 1 and may apply, for example, to a "turbosuper" boosting system arrangement in which air flows through the turbocharger 33 prior to entering the supercharger 15.

Disposed within the air duct 45 is an engine throttle 49, illustrated herein in FIG. 1 in its fully open condition, it being understood that, as is well known in the engine art, the engine throttle 49 may be controlled to be in any position between the fully open position shown in FIG. 1, and a fully closed position, blocking substantially all air flow through the air duct 45. The various types of engine throttles, and the construction details thereof, and methods of control thereof, are generally well known in the engine art, are outside the scope of the present invention, and will not be described further herein, except to the limited extent necessary to support the description of the present invention.

Disposed between the air duct 17 and the outlet 23 of the supercharger 15 (actually, shown as communicating with the air duct 29) is a bypass passage 51. Disposed within the bypass passage 51 is a bypass valve 53. The general construction and function of such a bypass passage 51 and bypass valve 53 are well known from superchargers, which are commercially available from the assignee of the present invention. As is well known in the supercharger art, the bypass valve 53 is normally closed when the supercharger 15 is operating to transfer volumes of air from the inlet 19 to the outlet 23. However, when reduced levels of boost are sufficient, the bypass valve 53 can be moved somewhat from its closed position (as shown in FIG. 1, in which no air can flow from the outlet back into the inlet), toward an open position in which an increasing amount of air is communicated from the outlet 23 back into the supercharger inlet 19.

One result of moving the bypass valve 53 toward a more open position is that the boost pressure of the air in the air duct 29 is somewhat reduced from the normal boost pressure present when the bypass valve 53 is fully closed. However, one difference in the bypass valve required for use in a superturbo boost system is that the overall air flow capacity (flow area) of the bypass valve 53 shown herein must be larger than the bypass valve which would be used in a typical, basic supercharger system. As the vehicle engine reaches relatively higher engine speeds, the clutch 27 will be disengaged, so that the supercharger 15 is not being driven, but at the same time, the turbocharger 33 is being driven by the flow of exhaust gas in the duct 37. During this mode of operation, the bypass valve 53 is in the fully opened position, and must be large enough not to present any undesirable flow restriction to the air, which flows from the intake 11, through the air duct 29, and through the compressor 31.

The exhaust gas duct 37 communicates with an inlet side of the turbine portion 35 of the turbocharger 33, and the turbine portion 35 also has an outlet, and from that outlet, exhaust gas is communicated by means of a duct 55 to an exhaust (see arrow). Communicating between the exhaust gas duct 37 and the duct 55 is another bypass duct 57, in which is disposed a bypass valve, which, typically, in the case of a turbocharger, is referred to as a "waste-gate" 59. The wastegate 59 may be made, and function, in accordance with the teachings of the prior art in regard to such wastegates.

Figure 2:
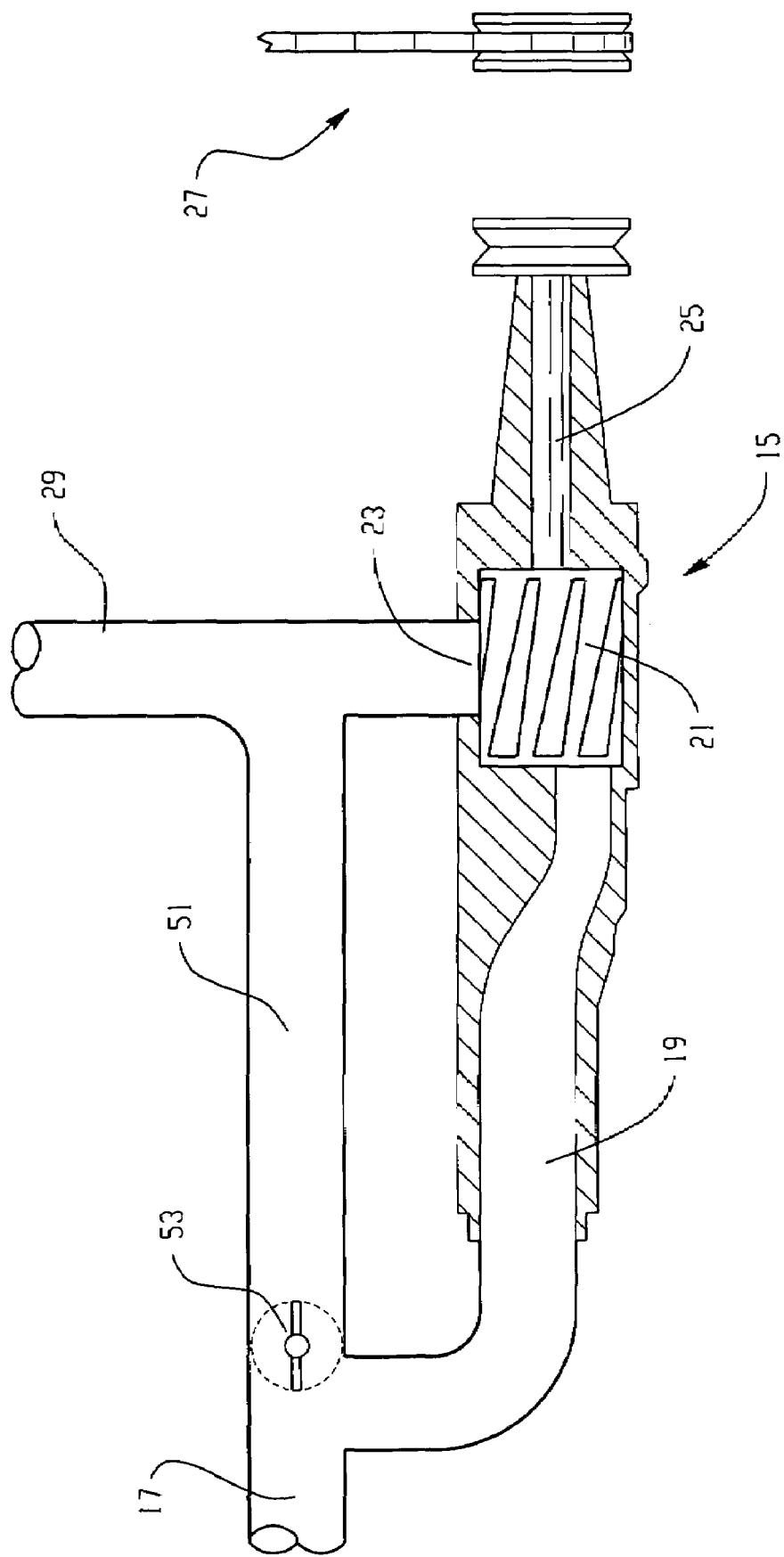
FIG. 2 is an enlarged, fragmentary schematic view, similar to FIG. 1, but with the clutch disengaged, and the bypass valve open.
Figure 3:
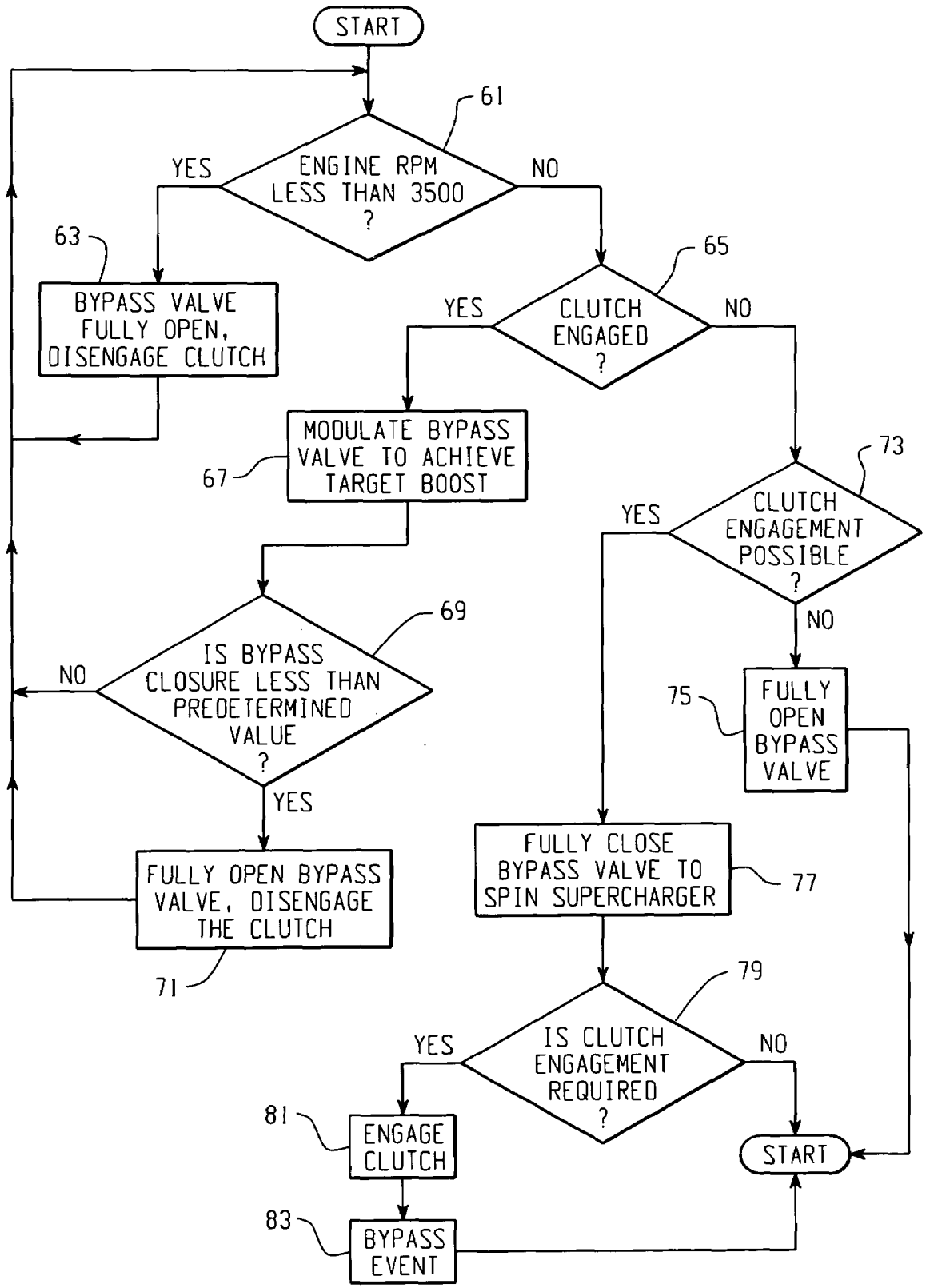
FIG. 3 is a logic block diagram setting forth the improved method of controlling the superturbo boosting system, in accordance with the present invention.

Referring now first to FIGS. 1 and 2, operation of the control method of the present invention will be described. Upon startup of the vehicle engine E the bypass valve 53 is in its fully open position (shown closed in FIG. 1), whereas the wastegate 59 is fully closed. FIG. 3 illustrates a logic block diagram, setting forth the improved method of controlling the superturbo boosting system shown in FIG. 1. Upon initialization ("START") of the control logic, the clutch 27 would be in the disengaged condition of FIG. 2, not providing input drive torque to the input shaft 25.

Referring still primarily to FIG. 3, the control logic first goes to a decision block 61, which determines whether the vehicle engine speed is equal to or greater than a predetermined speed, such as 3500 rpm. If the answer to the decision block 61 is "YES", the logic proceeds to an operation block 63 in which the system commands the bypass valve 53 to its fully open position and disengages the clutch 27 if engaged. On the other hand, if the answer to the decision block 61 is "NO", the logic then proceeds to a decision block 65. In the decision block 65, the control logic determines whether or not the clutch 27 is engaged. If the answer to the decision block 65 is "YES", the system proceeds to an operation block 67 in which the system modulates the bypass valve 53 (moves it between the "open" and "closed" positions) in order to achieve the "target" boost, i.e., the amount of boost that is appropriate for the then-current engine operating conditions. The control logic then proceeds to decision block 69 where it is determined whether the bypass valve 53 closure is less than a predetermined, minimum allowable closure (e.g., approximately 15% closure). If the answer to decision block 69 is "YES" (i.e., the bypass valve 53 is excessively opened and the supercharger is providing little or no boost), then the control logic proceeds to operation block 71 where the bypass valve 53 is fully opened and the clutch 27 is disengaged. If the answer to the decision block 69 is "NO", the system then proceeds again to "START", thus starting at the beginning of the control logic.

If the answer to the decision block 65 is "NO", the system then proceeds to a decision block 73 in which the control logic determines whether or not clutch engagement is possible. If the answer to the decision block 73 is "NO", the system proceeds to an operation block 75 in which the bypass valve 53 is fully opened.

On the other hand, if the answer to the decision block 73 is "YES", the system proceeds to an operation block 77 in which the bypass valve 53 is commanded to its fully closed position. Once the bypass valve 53 is fully closed, all charge air entering the intake 11 and flowing through the air filter 13 and the air duct 17 is forced to flow through the inlet 19 of the supercharger 15. The above-described airflow passes from the inlet 19 through the rotors 21 to the outlet 23, thus causing the rotors 21 to rotate which, in turn, rotates the input shaft 25. Now, instead of the speed difference between the clutch input 27 and the input shaft 25 being whatever the speed of the clutch input is (because the speed of the input shaft is zero), having the inlet air flow drive the rotors 21, to drive the input shaft 25, will greatly reduce the speed differential (e.g., by 30-50% typically). Notably, the energy to rotate the rotors 21 is obtained from what were previously throttling losses, which provides an overall improvement in system efficiency.

After the operation block 77, the control logic then proceeds to a decision block 79, which determines whether or not, under the then-current engine conditions, clutch engagement is required. If the answer to the decision block 79 is "NO", the system then proceeds again to "START", thus starting at the beginning of the control logic. If the answer to the decision block 79 is "YES", the system proceeds to an operation block 81 in which a command is sent to the controller for the clutch 27, commanding that it transition from the disengaged condition shown in FIG. 2 to the engaged condition shown in FIG. 1. With the input shaft 25 being driven at a speed which is less than that of the clutch input 27, but may be fairly close, the engagement of the clutch 27 is greatly facilitated, and occurs in a manner which should be nearly transparent to the vehicle driver. In other words, the method of the invention minimizes the undesirable effects of sudden clutch engagement, thereby improving overall clutch durability, and reducing NVH problems.

Figure 4:
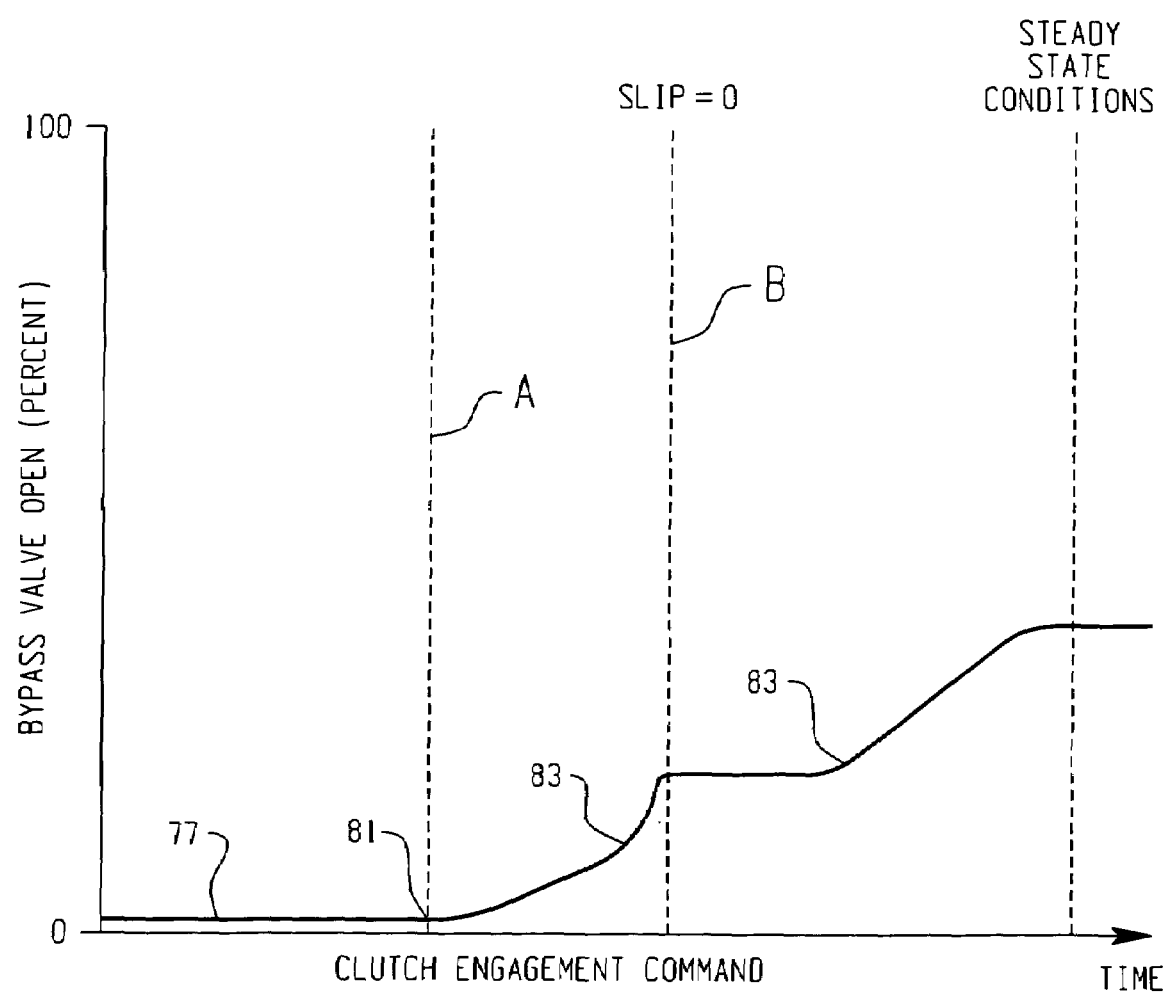
FIG. 4 is a graph of Bypass Valve Position, in terms of % Open, as a function of Time, illustrating one aspect of the improved method of control of the present invention.

After the operation block 81, the control logic proceeds to an operation block 83 in which the system commands the operation of a bypass event, to be described subsequently. Referring now to FIG. 4, the reference numerals appearing on the graph correspond to the blocks shown in the logic block diagram of FIG. 3. Therefore, near the beginning of the time period represented in the graph, it is shown that the bypass valve 53 is nearly or fully closed (nearly or fully 0% Open) as a result of operation block 77 in which a command is sent to fully close the bypass valve 53, thus starting to spin the rotors 21. At a time "A", the command is sent to engage the clutch (operation block 81). Thereafter, as the rotors 21 spin even faster, a command is transmitted to the bypass valve 53 (operation block 83) to begin gradually opening (partially) the bypass valve 53, to minimize the boost load during clutch engagement. At a time "B", a condition of zero clutch slip occurs in which the clutch 27 has fully transitioned from being disengaged to being engaged. For a relatively quick responding system, the bypass valve 53 may be partially opened prior to zero slip (time "B"), as shown in FIG. 4, and for a relatively slow responding system, opening of bypass valve 53 may not begin until after zero slip. The most aggressive response (and the most efficient use of the supercharger 15) will occur when the bypass valve 53 is kept as closed as possible without overboosting.

To maintain a more constant manifold pressure, the bypass valve 53 may be opened further as the turbocharger 33 transitions toward a steady state operating condition as shown in FIG. 4. The rate at which the bypass valve 53 opens will depend on, among other things, the size of the supercharger 15 and the turbocharger 33, and the volume of intake ducting. Additionally, for many conditions, the supercharger 15 will not be needed after the system nears steady state conditions and would disengage (reaching the predetermined minimum allowable bypass closure denoted in decision block 69 in FIG. 3).

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of controlling an internal combustion engine boosting system of the type comprising an exhaust-driven turbocharger and a mechanically-driven supercharger in series with said turbocharger; said supercharger having rotors and a clutch operable in a first condition to transmit torque from a source of mechanical drive to an input of said supercharger in response to a positive input, and operable in a second condition to interrupt the transmission of torque from said source to said input of said supercharger; said supercharger having an inlet, an outlet and a bypass passage providing fluid communication between said inlet and said outlet, and a bypass valve disposed within said bypass passage and operable between an open position permitting flow through said bypass passage, and a closed position blocking flow through said bypass passage, said method being characterized by:
  (a) determining possible operation of said clutch in said first condition; and
  (b) commanding said bypass valve toward said closed position, forcing air through said supercharger from said inlet through said outlet; said air flow causing said supercharger rotors to rotate, thus rotating said input of said supercharger prior to said clutch operating in said first condition.

2. The method of claim 1, characterized by said determining step including sensing said input for the presence of a positive input signal to said clutch indicating possible operation of said clutch in said first condition.

3. The method of claim 1, characterized by determining if engagement of the clutch is required subsequent to said commanding step and engaging said clutch if so required.

4. The method of claim 3, characterized by opening said bypass valve to minimize system boost load before, during or after clutch engagement.

5. The method of claim 4, characterized by gradually opening said bypass valve prior to full clutch engagement.

6. The method of claim 4, characterized by opening said bypass valve after full clutch engagement.

7. The method of claim 4, characterized by keeping said bypass valve as closed as possible without overboosting said system.

8. The method of claim 4, characterized by further opening said bypass valve after said clutch is fully engaged and said turbocharger is transitioning toward a steady state operating condition.

9. The method of claim 1, wherein said supercharger comprises a Roots type blower supercharger.

* * * * *